US008279623B2

(12) United States Patent
Idzik et al.

(10) Patent No.: US 8,279,623 B2
(45) Date of Patent: Oct. 2, 2012

(54) APPARATUS FOR VIBRATING A PORTABLE ELECTRONIC DEVICE

(75) Inventors: Jacek S. Idzik, Kenilworth (CA); Siong (Shawn) Litingtun, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/976,465

(22) Filed: Dec. 22, 2010

(65) Prior Publication Data

US 2012/0162939 A1   Jun. 28, 2012

(51) Int. Cl.
*H04B 1/38*   (2006.01)

(52) U.S. Cl. ............... 361/814; 455/567; 455/575.1; 310/348; 340/7.6

(58) Field of Classification Search .......... 174/50; 361/834, 679.02, 600, 807, 809, 814; 455/567, 455/575.1; 310/331, 322, 348, 311; 340/7.6
See application file for complete search history.

(56) References Cited

U.S. PATENT DOCUMENTS

| | | | | |
|---|---|---|---|---|
| 3,618,070 A | * | 11/1971 | Kagan | 340/7.6 |
| 5,023,504 A | * | 6/1991 | Mooney et al. | 310/322 |
| 5,229,744 A | | 7/1993 | Ogura | |
| 5,657,205 A | * | 8/1997 | Tamaru et al. | 361/761 |
| 6,011,699 A | * | 1/2000 | Murray et al. | 361/814 |
| 6,194,816 B1 | | 2/2001 | Wakabayashi et al. | |
| 6,389,302 B1 | * | 5/2002 | Vance | 455/567 |
| 7,205,978 B2 | | 4/2007 | Poupyrev et al. | |
| 7,309,253 B2 | * | 12/2007 | Ge et al. | 439/500 |
| 7,565,070 B1 | | 7/2009 | Gutierrez | |
| 7,579,758 B2 | * | 8/2009 | Maruyama et al. | 310/348 |
| 7,663,604 B2 | * | 2/2010 | Maruyama et al. | 345/173 |
| 7,999,660 B2 | * | 8/2011 | Cybart et al. | 340/407.2 |
| 2003/0022702 A1 | * | 1/2003 | Usuki et al. | 455/567 |
| 2003/0036364 A1 | * | 2/2003 | Chung | 455/90 |
| 2006/0152112 A1 | * | 7/2006 | Sasaki | 310/331 |
| 2009/0151485 A1 | | 6/2009 | Pais et al. | |
| 2010/0127601 A1 | | 5/2010 | Pettersson | |

FOREIGN PATENT DOCUMENTS

WO   00/65805 A1   11/2000

OTHER PUBLICATIONS http://redferret.net/?p=9533—published Nov. 6, 2007.
http://symbian-freak.com/news/007/11/the_fifth_senses.htm—published Nov. 7, 2007.
Extended European Search Report dated Mar. 29, 2011, issued from the corresponding European patent application No. 10196675.2.

* cited by examiner

*Primary Examiner* — Angel R Estrada
*Assistant Examiner* — Dimary Lopez
(74) *Attorney, Agent, or Firm* — Lesley M. Morrison; Borden Ladner Gervais LLP (57) ABSTRACT

A portable electronic device includes: a housing, a power pack received in the housing, and an actuator disposed between the power pack and a component of the portable electronic device, the component being in a fixed position relative to the housing, wherein the actuator imparts a force on the power pack to move the power pack relative to the housing.

10 Claims, 6 Drawing Sheets

APPARATUS FOR VIBRATING A PORTABLE ELECTRONIC DEVICE

TECHNICAL FIELD

The present application relates to portable electronic devices having vibrating capability.

BACKGROUND DISCUSSION

Many portable electronic devices, such as cell phones, Smartphones and personal digital assistants (PDAs), for example, provide haptic feedback to the user. In some portable electronic devices, piezo actuators are mounted on an underside of a display screen to vibrate the display screen, which is used as a counterweight. The display screen is typically mounted loosely in the device in order to allow for the display screen to vibrate.

BRIEF DESCRIPTION OF THE DRAWINGS

Embodiments of the present application will now be described, by way of example only, with reference to the attached Figures, wherein.

DETAILED DESCRIPTION

The apparatus described below is directed to a portable electronic device in which the power pack for the portable electronic device is a vibration counterweight. In an aspect there is provided a portable electronic device including: a housing; a power pack received in the housing; and an actuator disposed between the power pack and a component of the portable electronic device, the component being in a fixed position relative to the housing; wherein the actuator imparts a force on the power pack to move the power pack relative to the housing.

In another aspect there is provided, a portable electronic device including: a housing; a support for receiving a power pack, the support being movable relative to the housing and comprising electrical contacts for electrically communicating with the power pack; and an actuator disposed between the support and a component of the portable electronic device, the component being in a fixed position relative to the housing; wherein the actuator imparts a force on the support for moving the support and the power pack.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 1:
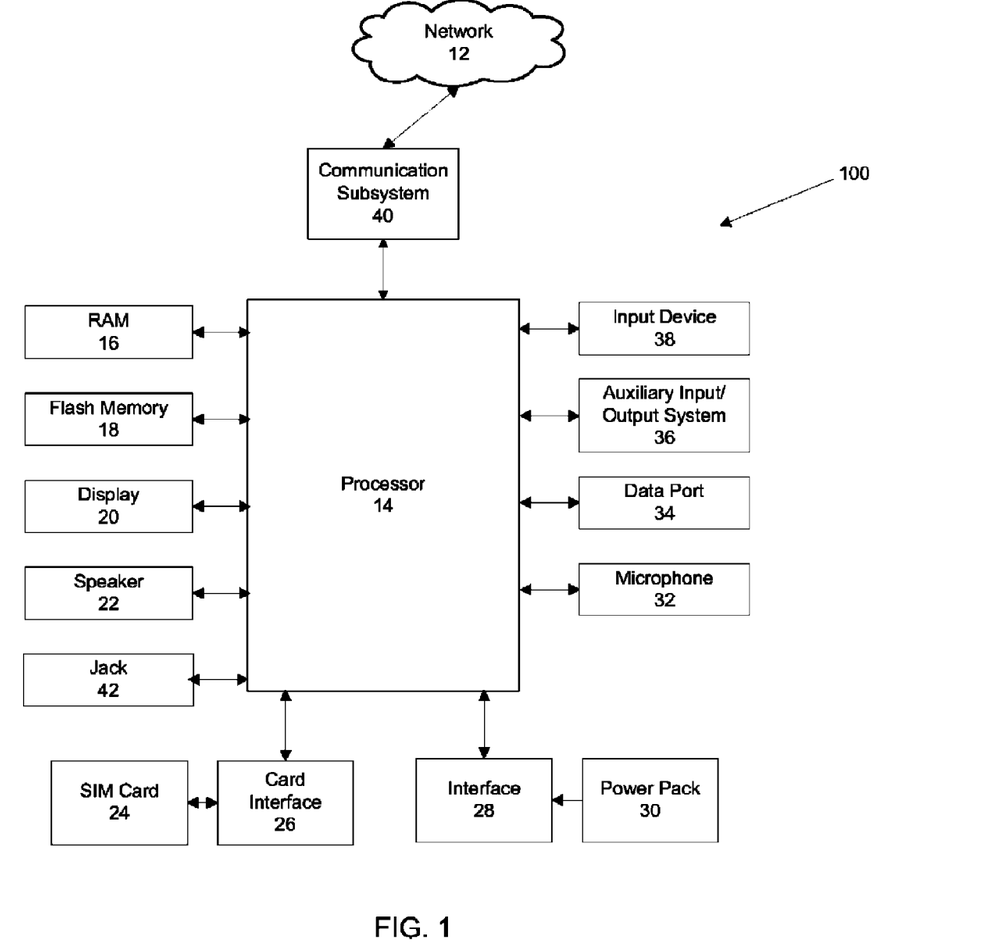
FIG. 1 is a block diagram of a portable electronic device according to an embodiment.

Referring now to FIG. 1, components of an example portable electronic device 100 are generally shown. The portable electronic device 100 includes data communication capabilities and may communicate with other electronic devices directly or through a wireless network. The portable electronic device 100 is based on the computing environment and functionality of a handheld computer. It will be understood, however, that the portable electronic device 100 is not limited to a handheld computer. Other portable electronic devices are possible, such as pagers, cellular telephones, smart telephones, wireless organizers, electronic messaging devices, remote controls, game controllers, personal massagers and wirelessly enabled notebook computers. Such devices may have, but need not have, many of the same elements as the illustrative portable electronic device 100.

The portable electronic device 100 includes a number of components including processor 14, which controls the overall operation of the device 100. A communication subsystem 40 controls data and voice communication functions, such as email, PIN (Personal Identification Number) message functions, SMS (Short Message Service) message functions and cellular telephone functions, for example. The communication subsystem 40 is in communication with a wireless network 12, which may be a data-centric wireless network, a voice-centric wireless network or a dual-mode wireless network.

In FIG. 1, the communication subsystem 40 is a dual-mode wireless network that supports both voice and data communications. The communication subsystem 40 is configured in accordance with the Global System for Mobile Communication (GSM) and General Packet Radio Services (GPRS) standards. The communication subsystem 40 may alternatively be configured in accordance with Enhanced Data GSM Environment (EDGE) or Universal Mobile Telecommunications Service (UMTS) standards. Other wireless networks may also be associated with the portable electronic device 100, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 12 includes base stations (not shown) that provide a wireless link to the portable electronic device 100. Each base station defines a coverage area, or cell, within which communications between the base station and the portable electronic device 100 can be effected. The portable electronic device 100 is movable within the cell and can be moved to coverage areas defined by other cells. Data is delivered to the portable electronic device 100 via wireless transmission from the base station. Similarly, data is sent from the portable electronic device 100 via wireless transmission to the base station.

The communication subsystem 40 further includes a short range communications function, which enables the device 100 to communicate directly with other devices and computer systems without the use of the wireless network 12 through infrared or Bluetooth™ technology, for example.

Prior to the portable electronic device 100 being able to send and receive communication signals over the wireless network 12, network registration or activation procedures must have been completed. In order to enable network communication, a SIM (Subscriber Identity Module) card 24 is inserted into a card interface 26. The SIM card, or Removable User Identity Module card, is used to identify the user of the portable electronic device, store personal device settings and enable access to network services, such as email and voice mail, for example, and is not bound to a particular portable electronic device 100.

The processor 14 is also connected to a Random Access Memory (RAM) 16 and a persistent updateable memory, such as flash memory 18. An operating system and device software are typically stored in flash memory 18 and are executable by the processor 14. Some device software components may alternatively be stored in RAM 16. The portable electronic device 100 includes computer executable programmed instructions for directing the portable electronic device 100 to implement various applications. Some examples of applications that may be stored on and executed by the device 100 include: electronic messaging, games, calendar, address book and music player applications. Software applications that control basic device operation, such as voice and data communication, are typically installed during manufacture of the device 100. For devices that do not include a SIM card 24, user identification information may be programmed into the flash memory 18. The flash memory 18 may alternatively be a persistent storage, a Read-Only Memory (ROM) or other non-volatile storage.

Figure 2A:
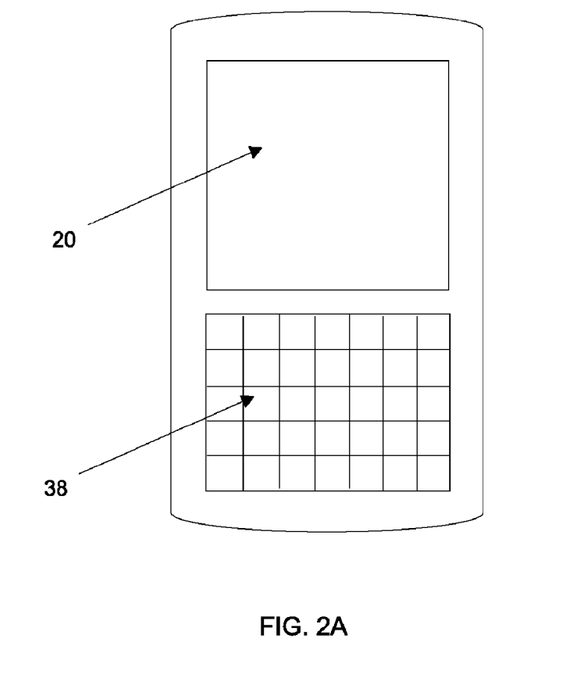
FIG. 2A is front view of an example portable electronic device.
Figure 2B:
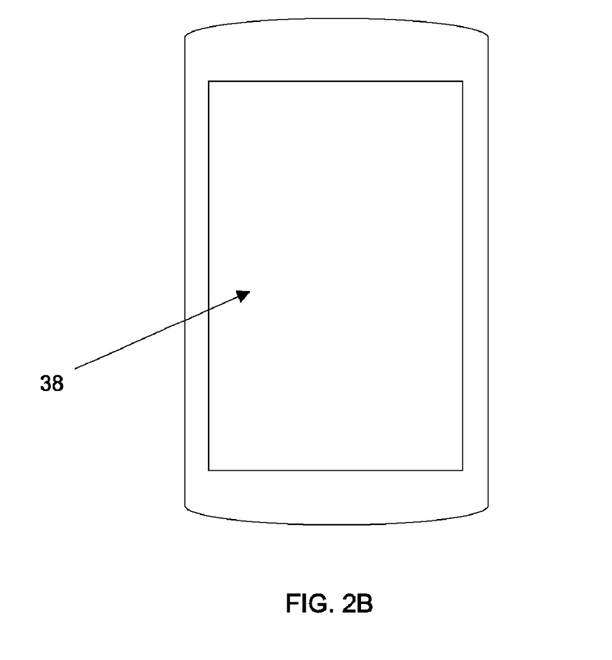
FIG. 2B is front view of another example portable electronic device.

Referring also to FIG. 2, the processor 14 receives input from input device 38. The input device 38 may be a keypad that is a complete alphanumeric keypad or telephone-type keypad. More than one input device 38 may be provided. Examples of input devices that may be used instead of or in combination with the keypad include: single or multi-function buttons, a touch sensitive display, a mouse, a trackball, an optical track pad or a roller wheel with dynamic button pressing capability. The portable electronic devices 10 of FIGS. 2A and 2B are shown by way of example. Many different device types, shapes and input device configurations are possible.

The processor 14 outputs to various output devices including the display 20, which may be a LCD display screen or a touch sensitive display, for example. A speaker 22 outputs audible information converted from electrical signals, and a microphone 32 converts audible information into electrical signals for processing.

A data port 34 is connected to the processor 14 for enabling data communication between the portable electronic device 100 and another computing device. An interface 28 is provided for receiving a power pack 30. In the embodiment shown in FIG. 1, the data port 34 is usable for data transfer only and the interface 28 is provided to allow for charging of the power pack 30. Alternatively, the data port 34 may include data lines for data transfer and a supply line for charging the power pack 30. An auxiliary Input/Output System 36 and a Jack 42 are also connected to the processor 14.

The power pack 30 may include, for example, one or more energy storage elements, for example, one or more battery cells. The power pack 30 may include a housing for the energy storage elements. Battery cells may store energy chemically, and are not limited to a particular type of battery chemistry. Battery types include: Lithium Ion-based batteries, Nickel Cadmium, Nickel Metal Hydride and Silver or Zinc-based batteries, for example. The power pack 30 may in addition to or alternatively include a fuel cell that uses hydrogen (from hydrides), methanol, ethanol or butane as fuel. As will be discussed in more detail below, a portable electronic device may use the power pack as a vibration counterweight. As used herein, "power pack" may mean, but does not necessarily mean, all power supply or energy storage elements. "Power pack" may comprise a single element of a power supply or energy storage system having many elements. For example, in some embodiments, a portable electronic device may include, for example, a user-replaceable power element (such as a battery of one chemistry) and a built-in power element (such as a battery of a different chemistry), and the built-in power element serves as a counterweight while the replaceable element does not. In another example, a portable electronic device may include a conventional chemical battery and a fuel cell system (comprising a fuel storage element and a fuel cell), and the conventional battery serves as a counterweight while the fuel cell system does not The portable electronic device 100 is operable in a data communication mode and a voice communication mode. In the data communication mode, a received data signal representing information such as a text message, an email message, a media file to be transferred, or web page download is processed by the communication subsystem 40 and input to the processor 14. The processor 14 further processes the signal and renders images for display on the display screen 20. Alternatively, the processed signals may be output to another computing device through the data port 34. In order to transmit information in the data communication mode, the user of the portable electronic device 100 composes information for transmission, such as email messages, for example, using the input device 38. The composed information is transmitted through the communication subsystem 40 over the wireless network 12 or via short range communications. Operation of the portable electronic device 100 in the voice communication mode is similar to the data communication mode, however, the received signals are output to the speaker 22, or an auxiliary device such as a headset or headphones, and signals for transmission are generated by the microphone 32. The portable electronic device 100 may also include other voice subsystems, such as a voice message recording subsystem, for example.

In response to an event (such as an incoming telephone call, receipt of a new text message, activation of an alarm and the like), the portable electronic device 100 may vibrate. Vibration may be a signal to a user that an event of possible interest to the user has occurred. Further, the portable electronic device 100 may vibrate under other conditions as well. For example, vibration may be used to provide feedback to a user while the user is using the portable electronic device 100. The concepts discussed herein are not limited to any particular reason for the device 100 to vibrate. Furthermore, only a limited number of device subsystems have been described, and the concepts are not limited to devices having those subsystems.

Figure 3A:
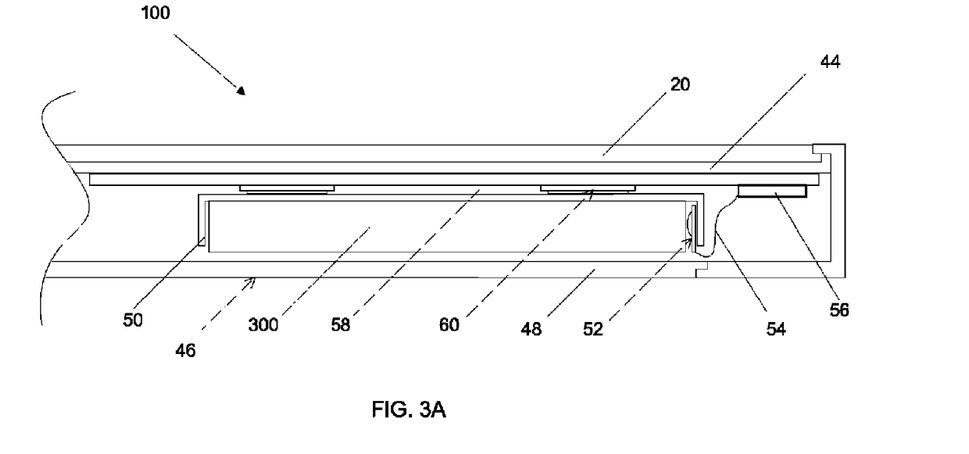
FIG. 3A is a side sectional view of a portion of a portable electronic device according to an embodiment.

Referring to FIG. 3A, in an embodiment, the portable electronic device 100 includes the display 20, which is received in a support tray 44, and mounted in a housing 46. The display 20 is a LCD display screen. An LCD display screen is, however, optional; some embodiments may use display elements that are different from LCD display screens, and other embodiments may include no display elements at all. A separate keypad (not shown) for receiving user input may also be provided. A seal (not shown) exists between the display 20 and the housing 46 to generally prevent contaminants, such as water, dirt and dust, for example, from penetrating the device 100. The display 20 is held firmly within the device 100 and generally does not move relative thereto. It has been learned through experimentation that such an arrangement is notably reliable in drop tests (in which a test device is subjected to controlled impact conditions simulating a dropping of the device, and examined for its functionality and integrity thereafter). The favorable drop test results for a firmly mounted display were notable in light of drop test results for a device with a loosely mounted display, as might be used in a device in which the display serves as a vibration counterweight. It was learned that shock absorption that may be associated with a loosely mounted display was not necessary for a device to perform well after a drop test. Because loose mounting also increased the risk that contaminants might enter the device, it was learned by experimentation that a firm mounting may reduce the risk of contamination and still have strong functionality and integrity following an impact. It was further learned by experimentation that the mass of another component, the power pack, may also serve as an effective vibration counterweight.

In the illustrative embodiment of FIG. 3A, the power pack 30 is single energy storage element, and in particular, a rechargeable battery 300. A back cover 48 is removably coupled to the housing 46 to provide access to the rechargeable battery 300, which is removably received by a support 50. In this context, "removably" indicates that the physical and/or electrical coupling between two elements may be engaged and disengaged by a user, usually without the need for tools. Electrical contacts 52 are provided at one end of the support 50 to electrically communicate with electrical contacts (not shown) of the rechargeable battery 300. The conducting elements by which the electrical power is communicated or conveyed from the battery 300 via the support 50 to other components in the device may be of any type. Wiring (or other electrical conductors) 54 extends between the electrical contacts 52 and a connector 56, which is mounted on a printed circuit board (PCB) 58 and electrically communicates therewith. The functionality of wiring 54 and connector 56 could be integrated into a single component.

The support 50 is movable with respect to the housing 46, and because the support 50 holds the battery 300, the battery 300 is movable with respect to the housing 46 as well. The amount of movability need not be large and depends on how securely the support 50 is mounted within the housing 46. For example, the amount of movability may be between 50 and 150 microns. Springs, elastic material, gaskets or the like may hold the support 50 and battery 300 in a substantially fixed position with respect to the housing 46, yet yield in response to mechanical force imparted or applied by one or more actuators, thereby enabling the support 50 and battery 300 to move with respect to the housing 46. A support may be useful because a support may help preserve the electrical connections that enable the battery to supply power for the portable electronic device, even when the battery is being moved. In some embodiments, however, a distinct support structure may be omitted.

Figure 3B:
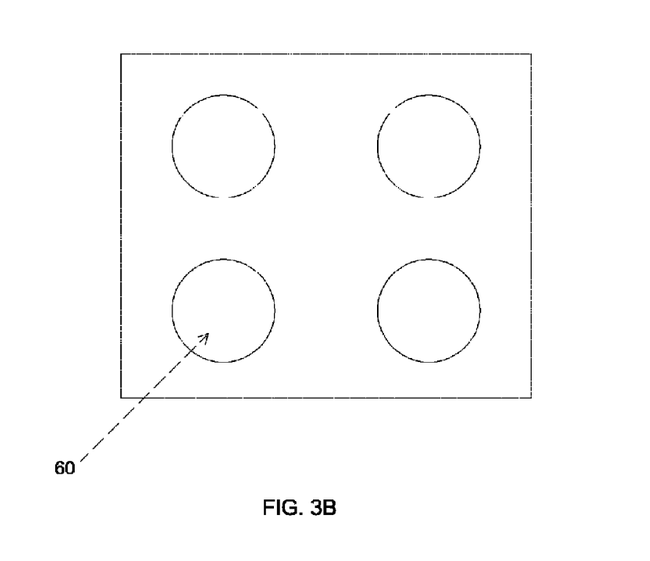
FIG. 3B is a schematic view depicting piezo actuator placement.

Actuators 60 are disposed between the support 50, which is movable relative to the housing 46, and another component that is in a relatively fixed deployment with respect to the housing 46. In FIG. 3A, the actuators 60 are disposed between the support 50 and the PCB 58. In some implementations, the actuators 60 may be disposed between the support 50 and another element, such as the display 20, or the housing 46 itself. Further, the actuators 60 may be in direct contact with the support 50 or may indirectly contact the support 50 through one or more other components. In general, the actuators 60 produce mechanical movement in response to electromagnetic control signals. The actuators 60 in FIGS. 3A and 3B may be piezoelectric ("piezo") actuators. In one embodiment, four piezo actuators 60 are spaced about an underside of the support 50, as shown in FIG. 3B. The piezo actuators 60 includes a piezoelectric element, such as a piezoelectric ceramic disk, fastened to a substrate, for example, by adhesive, lamination, laser welding, and/or by other suitable fastening method or device. The piezoelectric material may be lead zirconate titanate or any other suitable material. Although the piezo element is a ceramic disk in this example, the piezoelectric material may have any suitable shape and geometrical features, for example a non-constant thickness, chosen to meet desired specifications. The substrate may be comprised of a metal, such as nickel, or any other suitable material such as, for example, stainless steel, brass, for example. The substrate bends when the piezo element contracts diametrically, as a result of build up of charge when a high voltage is applied to the piezo element. The number of piezo actuators is not limited to four, any number of piezo actuators 60 may be provided in any arrangement.

In operation, the substrate of the piezo actuator bends or otherwise physically changes shape when an electromagnetic signal, which may be generated via a waveform generator, is received. The electromagnetic signal may be an electrical control signal conducted through the PCB 56. The characteristics of the waveform may be adjustable to provide a suitable amount of vibration based on the geometry, weight (or mass) and natural resonance of the portable electronic device 100. The piezo actuators 60 impart a force that causes the support 50 and battery 300 to move relative to the housing 46 so that the battery 300 functions as a counterweight to vibrate the portable electronic device 100. Generally speaking, the movement of the piezos by themselves might not produce a noticeable vibration; but when the piezos move a more massive element such as the battery 300, the result is a noticeable vibration of the device 100. In this way, the battery 300 serves not only as an energy storage element, but also as a counterweight that enables the device 100 to vibrate.

Figure 4:
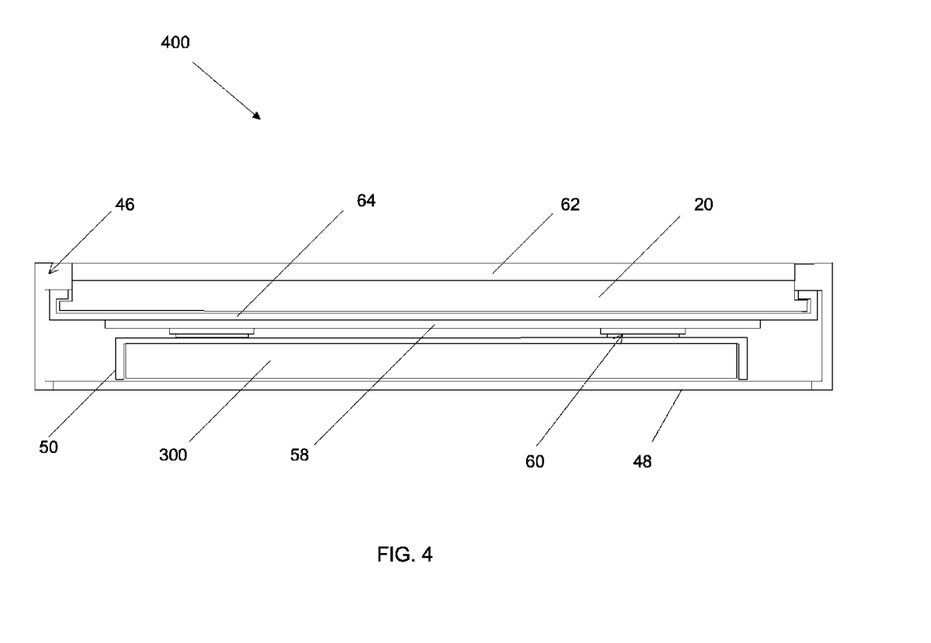
FIG. 4 is an end sectional view of another portable electronic device according to an embodiment.

Referring to FIG. 4, another embodiment of a portable electronic device 400 is shown. The embodiment of FIG. 4 is similar to the embodiment of FIG. 3 A; the embodiment in FIG. 4, however, includes a touch sensitive display 20 instead of a LCD display screen. The touch sensitive display 20 may be capacitive, resistive, infrared, surface acoustic wave (SAW) touch-sensitive display, strain gauge, optical imaging, dispersive signal technology, acoustic pulse recognition, and so forth. A capacitive touch-sensitive display includes a capacitive touch-sensitive overlay 62, which may be an assembly of multiple layers in a stack including, for example, a substrate, a ground shield layer, a barrier layer, one or more capacitive touch sensor layers separated by a substrate or other barrier, and a cover. The capacitive touch-sensitive overlay 62 and the display 20 are supported on a support tray 64, which is received in the housing 46.

Similar to the embodiment of FIG. 3A, the power pack 30 is a rechargeable battery 300, which is removably received in the support 50. The rechargeable battery 300 is accessible through the back cover 48 of the housing 46 to provide access to the rechargeable battery 300. The electrical contacts 52, which are provided at one end of the support 50, are in electrical communication with electrical contacts (not shown) of the rechargeable battery 300. Wiring or other electrical conductors (not shown in FIG. 4) extends between the electrical contacts 52 and the connector 56, which is mounted on the PCB 58 and electrically communicates therewith. Piezo actuators 60 are provided between the support 50 and the PCB 58. In one embodiment, four piezo actuators 60 are spaced about an underside of the support 50. A seal (not shown) exists between the display 20 and the housing 46 to generally prevent contaminants, such as water, dirt and dust, for example, from penetrating the device 100. The display 20 is held firmly within the device 100 and generally does not move relative thereto, making this arrangement reliable in drop tests.

Figure 5:
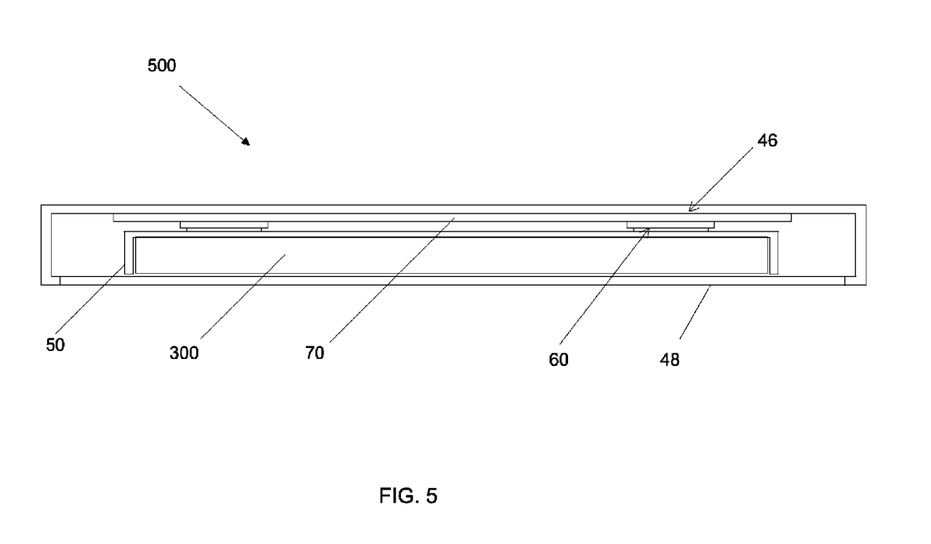
FIG. 5 is an end sectional view of still another portable electronic device according to an embodiment.

Referring to FIG. 5, in another embodiment, a portable electronic device 500 is shown. The portable electronic device 500 may be a pager, which vibrates when a message is received, or a vibration device for use in a personal massager or a children's toy for example. The portable electronic device 500 includes a rechargeable battery 300 that is removably received in support 50 and accessible through the back cover 48 of housing 46. Piezo actuators 60 are provided between the support 50 and a support structure 70. The support structure 70 may be a PCB 58, as shown in the previous embodiments. If a PCB 58 is not included in this embodiment, the support structure 70 may be a metal frame, or another component suitable to provide structural integrity.

In the embodiments described above, the support 50 is a tray including at least a pair of opposed sidewalls and a recess for receiving the battery 300. The support 50 may be any structure that may be coupled between the piezo actuators 60 and the battery 300 that is capable to transferring motion from the piezo actuators 60 to the battery 300. In one embodiment, the support 50 may be one or more coupling elements that fasten the piezo actuators 60 to the battery 300. The coupling elements are generally rigid to avoid dampening the vibrating force exerted by the piezo actuators 60. on the battery 300.

Figure 6:
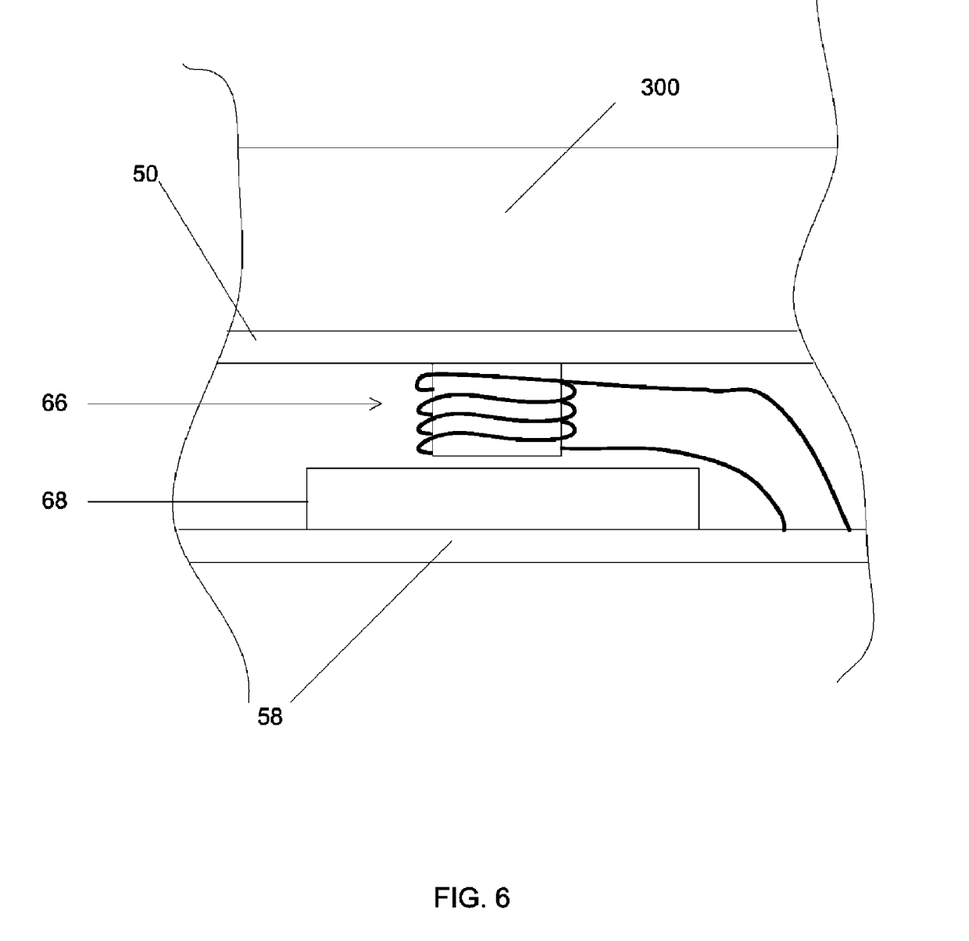
FIG. 6 is a side sectional view of an electromagnet/permanent magnet in a portable electronic device.

In another embodiment (as illustrated by FIG. 6), instead of piezo actuators, actuators may be embodied as one or more electromagnets 66. The electromagnet 66 may be deployed proximate to another element that may be attracted or repelled by a magnetic field, such as a piece of ferromagnetic material, another electromagnet, or a permanent magnet. In the embodiment depicted in FIG. 6, the electromagnet 66 is deployed proximate to a permanent magnet 68, which in this example is a component in a fixed position relative to the housing. In this embodiment, the electromagnet 66 oscillates relative to the permanent magnet 68 in response to the polarity of the electromagnet being alternated. As a result, the electromagnet 66 and the permanent magnet 68 are alternately attracted and repelled. The electromagnet 66 moves the support 50 with respect to the housing, which in turn moves the battery 300 with respect to the housing. The result is a noticeable vibration of the portable electronic device 100.

In further embodiments, the actuators may include elements that rotate or twist or lever or move in multiple directions. The movement of the actuators moves the power pack, which serves as a counterweight, causing the portable electronic device to vibrate.

In still another embodiment, the internal components of the portable electronic device 100 may be arranged so that the piezo actuators 60 are sandwiched between the support 50 and a component other than the PCB 58. For example, the piezo actuators 60 may be sandwiched between the support 50 and a support tray of the display 20. Alternatively, the piezo actuators 60 may be sandwiched between the support 50 and a metal frame, for example.

Several benefits may be realized by one or more of the embodiments of the concept. A potential advantage of the embodiments described herein is that when the display is not being used as a counterweight to vibrate the portable electronic device 100, the display may be held firmly and sealed within the housing 46. Sealing and firm mounting of the display reduces the likelihood that water or dust or other contaminants may enter the device 100. Further, as has been mentioned above, it has been learned by experimentation that the portable electronic device 100 has a strong performance in drop tests. The strong functionality and integrity may result from having a counterweight (a power pack 30) that is less exposed to the external environment, and from having a display 20 that is unlikely to be dislodged from the housing 46 or crack when it is held firmly within the device 100.

A further potential benefit of one of more embodiments is that the power pack serves multiple functions without consuming significantly more space or adding significantly more weight. Space and weight concerns are especially beneficial for portable electronic devices that are handheld, that is, sized and shaped to be held or carried in a human hand. In many implementations, the mass of the power pack is large, in relation to the mass of the portable electronic device as a whole, such that the mass of the power pack can be an effective counterweight. Use of a dead-weight counterweight, which adds weight to the device and takes up space but adds little additional functionality, may in some embodiments be eliminated.

A further possible benefit is that use of a power pack as counterweight may, but need not, supplant other counterweights. In other words, in some portable electronic devices, it may be prudent to include more than one counterweight. The power pack may be utilized as a counterweight in harmony with other counterweights in the portable electronic device. Other counterweights may include the display screen having a flexible mount or a dead-weight counterweight.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A portable electronic device comprising:
   a housing;
   a support for receiving a power pack, the support being movable relative to the housing and comprising electrical contacts for electrically communicating with the power pack; and
   an actuator disposed between the support and a component of the portable electronic device, the component being in a fixed position relative to the housing;
   wherein the actuator imparts a force on the support for moving the support and the power pack.

2. A portable electronic device as claimed in claim 1, wherein the component is a printed circuit board.

3. A portable electronic device as claimed in claim 1, wherein the component is a display.

4. A portable electronic device as claimed in claim 1, wherein the support is a tray comprising sidewalls and a recess for receiving the power pack.

5. A portable electronic device as claimed in claim 1, wherein the power pack is a chemical battery.

6. A portable electronic device as claimed in claim 1, wherein the actuator is in direct contact with the support.

7. A portable electronic device as claimed in claim 1, wherein more than one actuator is disposed between the support and the component.

8. A portable electronic device as claimed in claim 1, comprising a display received in the housing.

9. A portable electronic device as claimed in claim 8, wherein the display is fixed relative to the housing and a seal is provided between the display and the housing.

10. A portable electronic device as claimed in claim 1, wherein the actuator is a piezo actuator.

* * * * *

UNITED STATES PATENT AND TRADEMARK OFFICE
CERTIFICATE OF CORRECTION

PATENT NO. : 8,279,623 B2  Page 1 of 1
APPLICATION NO. : 12/976465
DATED : October 2, 2012
INVENTOR(S) : Jacek S. Idzik et al.

It is certified that error appears in the above-identified patent and that said Letters Patent is hereby corrected as shown below:

On the title page, item (75) Inventors, second inventor last name, delete "Litingtun" and insert therefor --LiTingTun--

Signed and Sealed this
Eleventh Day of December, 2012

David J. Kappos
*Director of the United States Patent and Trademark Office*